US011702143B2

United States Patent
Nagy

(10) Patent No.: US 11,702,143 B2
(45) Date of Patent: Jul. 18, 2023

(54) HOOD

(71) Applicant: Ningbo Geely Automobile Research & Development Co., Ltd., Ningbo (CN)

(72) Inventor: Robert Nagy, Lerum (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 316 days.

(21) Appl. No.: 17/074,437

(22) Filed: Oct. 19, 2020

(65) Prior Publication Data
US 2021/0031838 A1 Feb. 4, 2021

Related U.S. Application Data

(63) Continuation of application No. PCT/CN2019/082395, filed on Apr. 12, 2019.

(30) Foreign Application Priority Data

Apr. 23, 2018 (EP) .................................... 18168767

(51) Int. Cl.
*B62D 25/12* (2006.01)
*B62D 25/10* (2006.01)
*B60K 11/04* (2006.01)

(52) U.S. Cl.
CPC .............. *B62D 25/12* (2013.01); *B60K 11/04* (2013.01); *B62D 25/105* (2013.01)

(58) Field of Classification Search
CPC ....... B62D 25/12; B62D 25/105; B60K 11/04
See application file for complete search history.

(56) References Cited

U.S. PATENT DOCUMENTS

| 2,489,750 | A  | * | 11/1949 | Caldwell | ................ | H01H 31/28 |
|---|---|---|---|---|---|---|
| | | | | | | 74/96 |
| 10,155,547 | B1 | * | 12/2018 | Coppola | ................ | B60K 11/04 |
| 10,556,482 | B2 | * | 2/2020 | Coppola | ............ | B60H 1/00571 |
| 2012/0323448 | A1 | | 12/2012 | Charnesky | | |
| 2014/0202403 | A1 | | 7/2014 | Maki | | |

FOREIGN PATENT DOCUMENTS

| CN | 204915846 U | 12/2015 |
|---|---|---|
| CN | 205686479 U | 11/2016 |
| CN | 106252687 A | 12/2016 |
| CN | 205801264 U | 12/2016 |
| CN | 107310632 A | 3/2017 |
| CN | 106864603 A | 6/2017 |

(Continued)

OTHER PUBLICATIONS

International Search Report from corresponding International Application No. PCT/CN2019/082395, dated Jul. 11, 2019, 4 pages.

*Primary Examiner* — Dennis H Redder
*Assistant Examiner* — Melissa Ann Bonifazi
(74) *Attorney, Agent, or Firm* — Tucker Ellis LLP

(57) ABSTRACT

A hood for closing a compartment of a vehicle includes an outer panel forming a vehicle body outer side portion of the hood. The hood further includes a cooling channel structure arranged at an inner side portion of the outer panel, wherein the cooling channel structure is adapted for transferring a cooling fluid from a vehicle component and back to the vehicle component such that heat is exchanged via the outer panel with the vehicle surroundings.

15 Claims, 4 Drawing Sheets

(56) References Cited

FOREIGN PATENT DOCUMENTS

| | | | |
|---|---|---|---|
| CN | 107745750 | A | 3/2018 |
| DE | 10337869 | A1 | 3/2005 |
| DE | 102008022288 | A1 | 10/2009 |
| FR | 2909595 | A3 | 6/2008 |
| JP | 61150824 | A | 7/1986 |
| JP | 2007331440 | A | 12/2007 |

\* cited by examiner

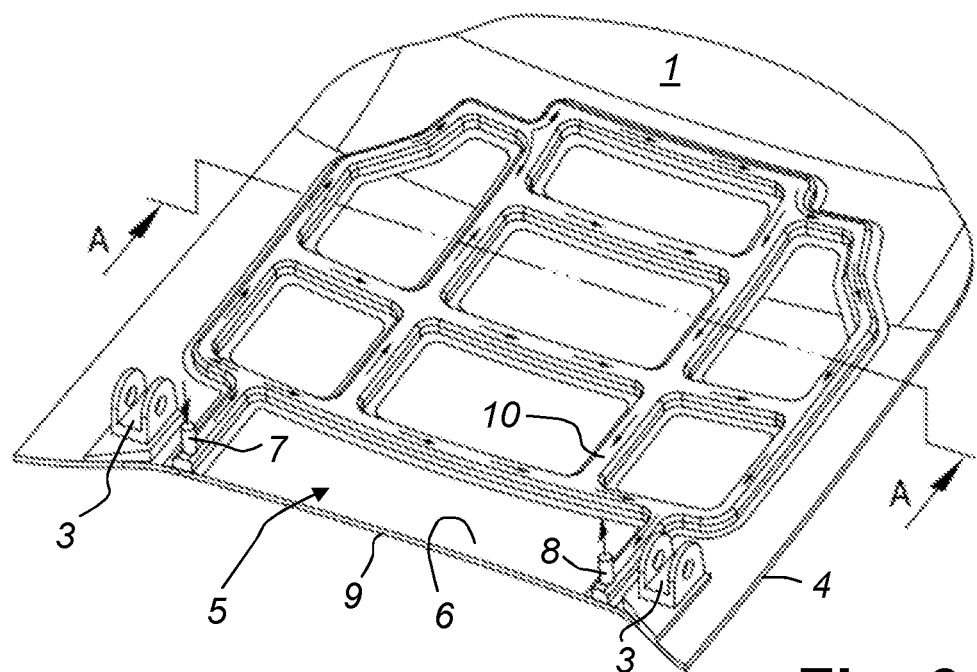
Fig. 3A
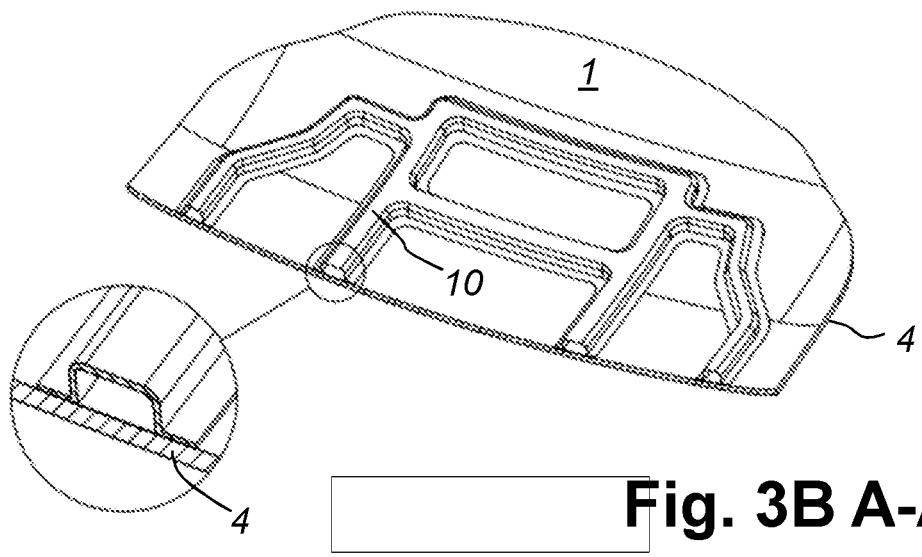
Fig. 3B A-A

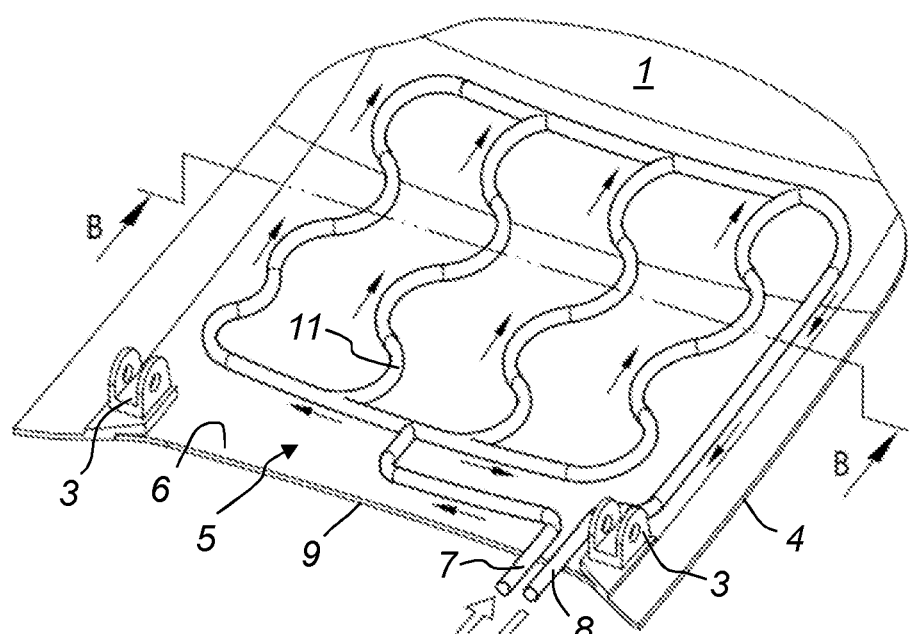
Fig. 4A
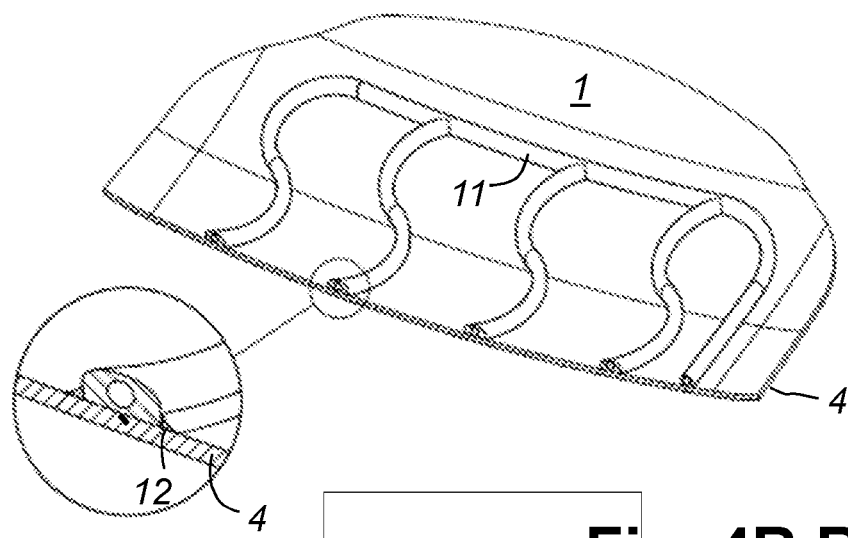
Fig. 4B B-B

HOOD

RELATED APPLICATION DATA

This application is a continuation of International Patent Application No. PCT/CN2019/082395, filed Apr. 12, 2019, which claims the benefit of European Patent Application No. 18168767.4, filed Apr. 23, 2018, the disclosures of which are incorporated herein by reference in their entireties.

TECHNICAL FIELD

The present invention relates to a hood for closing a compartment of a vehicle. The hood comprises an outer panel forming a vehicle body outer side portion of the hood.

BACKGROUND

In the field of cooling there are several approaches, the most common being the cooling with a front cooler for cooling the engine. Also, in order to cool the engine bay, openings in the hood have been used to convey air into the engine bay and using convection cooling. With electric vehicles and hybrids with a battery that can be charged with a cable connection, there is sometimes a need for cooling of the battery.

Electric vehicles use large batteries to store energy. The energy flowing into the battery pack as it is charged either from regenerative braking or from the grid and discharged from the pack to power the vehicle and its accessories is measured by electrical current and voltage. The flow of current causes heating in the battery cells and their interconnection systems proportional to the square of the current flowing multiplied by the internal resistance of the cells and the interconnect systems. The higher the current flow the more the heating effect will be.

The performance of Lithium Ion battery cells is greatly impacted by their temperature, they suffer from the Goldilocks effect, they do not perform well when too cold or too hot, which can lead to permanent and extreme damage of the cells or accelerated degradation. Most lithium battery cells begin to degrade quickly when their temperature is above 45 Celsius.

In the past the largest battery packs did not necessarily need any special cooling as the physical size of the packs was sufficient and the relative flow of current was not large compared to the overall capacity of the pack. As ever faster battery charging rates are demanded with recharge power of over 200 kW to deliver times of 30 minutes or less, higher performance electric vehicles with a requirement for consistent performance and adequate durability in global markets has meant that special thermal management methods for the battery pack are now required.

There are 3 common battery thermal management methods used today; convection to air either passively or forced, cooling by flooding the battery with a dielectric oil which is then pumped out to a heat exchanger system, and cooling by circulation of water based coolant through cooling passages within the battery structure.

SUMMARY

It is an object of the present invention to provide an alternative cooling system that has a decreased use of power compared to the cooling systems of present art.

According to a first aspect of the present disclosure there is provided a hood for closing a compartment of a vehicle, wherein the hood comprises an outer panel forming a vehicle body outer side portion of the hood. The hood comprises a cooling channel structure arranged at an inner side portion of the outer panel. The cooling channel structure is adapted for transferring a cooling fluid from a vehicle component and back to the vehicle component such that heat is exchanged via the outer panel with the vehicle surroundings. The heat exchange is mainly due to convection if the vehicle is moving and mainly heat radiation if the vehicle is not moving.

According to one aspect of the present disclosure the cooling channel structure extends over a main part of the outer panel. The channel structure is arranged to be evenly distributed over the outer panel. In the case of one channel it is arranged such that it goes back and forth over the outer panel with equal distance between the parallel parts of the channel. In the case of more channels, for instance if the channel structure is such that one channel is forked into two or more channels, the channel parts are equally distanced where they are parallel to one another.

According to a further aspect of the present disclosure the cooling channel structure comprises a plurality of spaced first channel portions extending in a first direction.

The first direction is according to another aspect of the present disclosure commensurate with a direction between front side of the hood and a rear side of the hood and wherein the first channel portions are spaced in a hood transverse direction.

In an alternative aspect of the present disclosure the cooling channel structure comprises a plurality of spaced second channel portions extending in a second direction transverse relative to the first direction. A further possibility is that the second direction is commensurate with a transverse direction of the hood and that the first channel portions are spaced in a hood forward direction.

According to a further aspect of the present disclosure the first channel portions are in fluid communication with the second channel portions.

In yet another aspect of the present disclosure the cooling channel structure comprises an inlet and an outlet arranged at a first side of the hood.

According to yet another aspect of the present disclosure the hood comprises at least one hood hinge element for pivoting the hood between an open position and a closed position and wherein the hinge element is arranged at the first side of the hood. This minimizes the length of the connections required.

According to a preferred aspect of the present disclosure the cooling channel structure is arranged such that the flow of coolant liquid is divided into at least two flows after the inlet and merged into one flow upstream the outlet.

In another aspect of the present disclosure the cooling channel structure is at least partly made of aluminum.

Further, according to another aspect of the present disclosure the cooling channel structure is directly attached to an inner side surface of the outer panel.

The cooling channel structure is according to a further aspect of the present disclosure attached to an inner side surface of the outer panel with a heat conducting joint. The joint could for instance be an adhesive or a welded/soldered joint.

According to one aspect of the present disclosure a vehicle comprises at least one vehicle component, which in an operational state is in need of heat exchange, and a hood according to the above disclosure, wherein the vehicle component is adapted to be fluidly connected to the cooling channel structure in a way forming a cooling loop. One example of a vehicle component is an internal combustion engine. Another example is a battery pack.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 3A is a perspective view of an underside of a vehicle hood.

FIG. 3B is a view of the section A-A in FIG. 3A.

FIG. 4A is perspective view of an underside of a vehicle hood.

FIG. 4B is a view of the section B-B in FIG. 4A.

DETAILED DESCRIPTION

Figure 1:
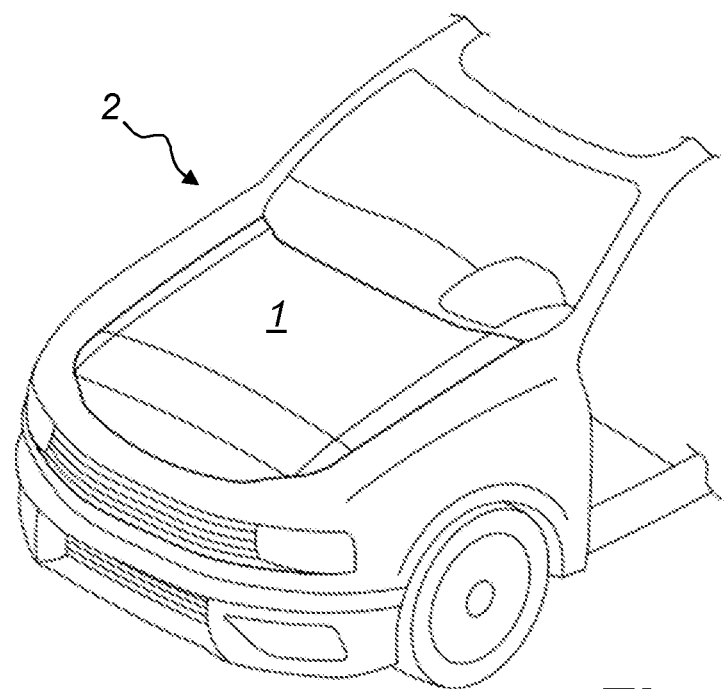
FIG. 1 is a perspective view of a front part of a vehicle.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 2:
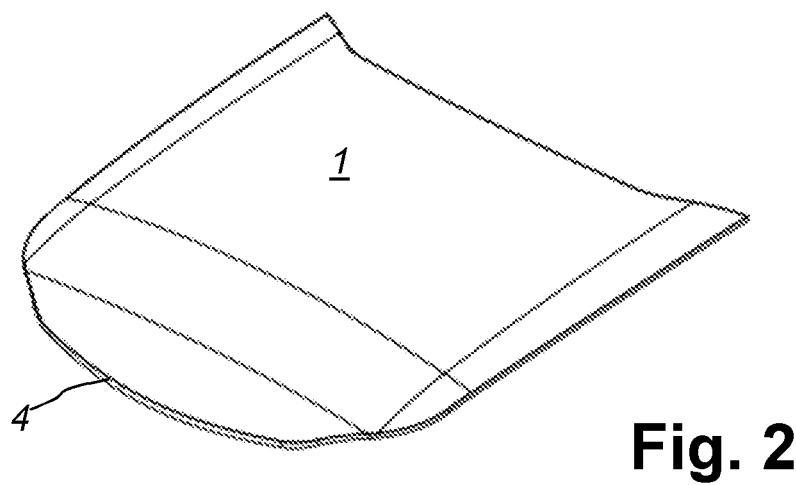
FIG. 2 is a perspective view of a vehicle hood.

With reference to FIG. 1 a vehicle 2 is shown having a hood 1. FIG. 2 shows the top side of an outer panel 4 of a hood 1.

Turning to FIGS. 3A and 3B, an engine hood 1 for a vehicle comprising at least one hood hinge element 3 and an outer panel 4 is shown. The outer panel constitutes the vehicle body outer side portion of the hood 1. A cooling liquid system 5 is arranged in a loop on the inner side portion 6 of the outer panel 4 of the hood 1 with an inlet 7 and an outlet 8 of the loop arranged on the hinged side 9 of the hood 1.

The cooling liquid system 5 utilizes an inner panel constituting a vehicle body inner side portion of the hood, wherein the inner panel comprises ridge portions 10 which swell toward the outer panel, i.e. they are wider at the outer panel in order to maximize the contact area and thus the heat conduction, such that the ridge portions 10 accommodate the cooling liquid system 5.

The ridge portions 10 are formed from a vehicle body front side to a vehicle body rear side at predetermined intervals in a vehicle transverse direction.

As can be seen in FIGS. 3A and 3B the ridge portions constitute the channels or conduits 10 conveying the cooling liquid. An advantage with this solution is that contact area between coolant and the panel is large in a natural way.

The loop is arranged such that the flow of coolant liquid is divided into at least two flows after the inlet 7 and merged into one flow upstream the outlet 8.

Turning to FIGS. 4A and 4B, an engine hood 1 for a vehicle 2 is shown comprising at least one hood hinge element 3 and an outer panel 4, the outer panel constituting the vehicle body outer side portion of the hood 1. A cooling liquid system 5 is arranged in a loop on the inner side portion 6 of the outer panel 4 of the hood 1 with an inlet 7 and an outlet 8 of the loop arranged on the hinged side 9 of the hood 1.

Compared to the previous example channels or conduits 11 here convey the cooling liquid. The conduits 11 are attached to the outer panel 4 with a heat conducting joint 12. The contact area with the outer panel 4 should be as large as possible in order to maximize the heat conduction. An advantage with this solution is that the conduits is a closed separate system with minimal risk of leakage.

The loop is arranged such that the flow of coolant liquid is divided into at least two flows after the inlet 7 and merged into one flow upstream the outlet 8.

Should the cooling loop in the hood be used during driving, as can be seen in FIGS. 3A and 4A, the coolant flow could advantageously be arranged such that there will be a counter current heat exchange with the oncoming air, at least for most of the loop.

Figure 5:
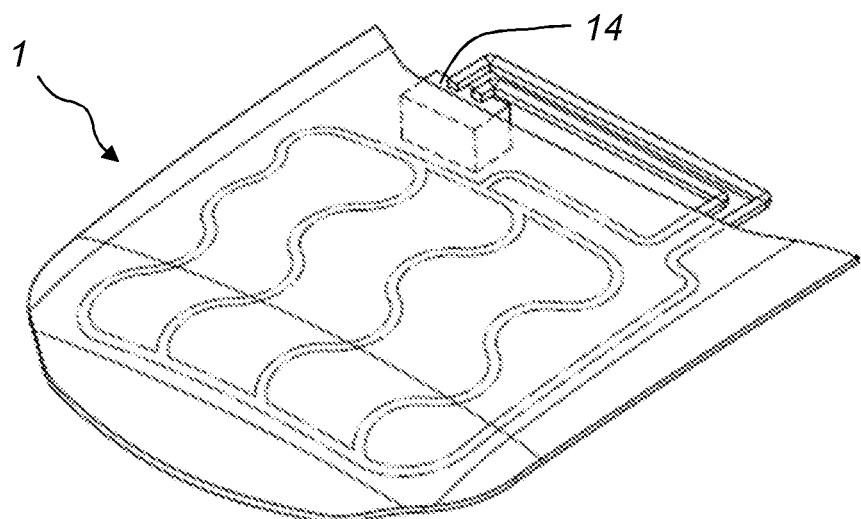
FIG. 5 is a partial perspective view of a hood connected to a battery.
Figure 6:
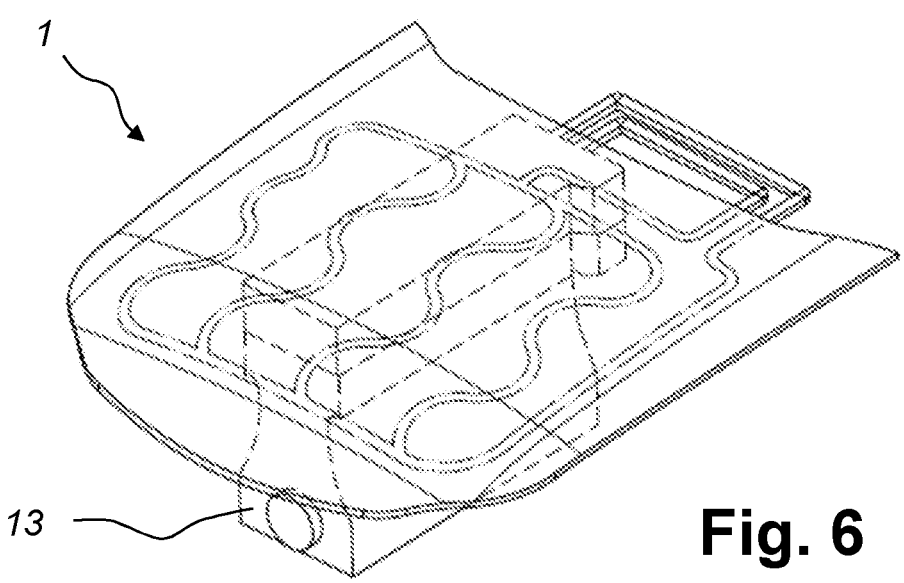
FIG. 6 is a partial perspective view of a hood connected to an internal combustion engine.

FIGS. 5 and 6 show the hood 1 according to the present invention where the channel structure is connected to a battery pack 14 and an internal combustion engine 13, respectively.

It is to be understood that the present invention is not limited to the embodiments described above and illustrated in the drawings; rather, the skilled person will recognize that many changes and modifications may be made within the scope of the appended claims. For example, in the drawings the coolant flow is divided utilizing a sort of manifold. There could be instances where a single conduit is used.

According to another aspect of the disclosed system it could under certain weather conditions also be used for heating purposes.

Further, the inner panel could constitute the vehicle body inner side portion of the hood. According to one example the inner panel comprises ridge portions which swell toward the outer panel such that the ridge portions accommodate the conduits 11 such that when complete, the conduits are covered by the ridge portions. The ridge portions should then be formed from a vehicle body front side to a vehicle body rear side at predetermined intervals in a vehicle transverse direction such that they cover the conduits 11.

A further alternative is to use circular conduits instead of the ones shown in FIG. 4B where the heat conductive joint instead would have to be bigger to maximize the contact area with the panel and thus the heat transfer between the panel and the conduits.

What is claimed is:

1. A hood for closing a compartment of a vehicle, wherein the hood comprises:
    an outer panel having an outer side forming a vehicle body outer side portion of the hood and an inner side opposite the outer side;
    a cooling channel structure comprised of a plurality of conduits that are attached to the inner side of the outer panel, and wherein the cooling channel structure transports cooling fluid from a vehicle component through the conduits and back to the vehicle component such that heat is exchanged from the cooling fluid to the vehicle surroundings via the outer panel; and one or more heat conducting joints that attach the conduits of the cooling channel structure to the inner side of the outer panel and, relative to the inner side of the outer panel, the heat conducting joints extend laterally from the conduits to increase contact area between the cooling channel structure and the outer panel.

2. The hood according to claim 1, wherein the cooling channel structure comprises a plurality of spaced first channel portions extending in a first direction.

3. The hood according to claim 2, wherein the first direction is commensurate with a direction between front side of the hood and a rear side of the hood and wherein the first channel portions are spaced in a hood transverse direction.

4. The hood according to claim 2, wherein the cooling channel structure comprises a plurality of spaced second channel portions extending in a second direction transverse relative to the first direction.

5. The hood according to claim 4, wherein the second direction is commensurate with a transverse direction of the hood and wherein the first channel portions are spaced in a hood forward direction.

6. The hood according to claim 2, wherein the cooling channel structure comprises a plurality of spaced second channel portions extending in a second direction transverse relative to the first direction and wherein the first channel portions are in fluid communication with the second channel portions.

7. The hood according to claim 1, wherein the cooling channel structure comprises an inlet and an outlet arranged at a first side of the hood.

8. The hood according to claim 7, wherein the hood comprises at least one hood hinge element for pivoting the hood between an open position and a closed position and wherein the hinge element is arranged at the first side of the hood.

9. The hood according to claim 7, wherein the cooling channel structure is arranged such that the flow of coolant liquid is divided into at least two flows after the inlet and merged into one flow upstream the outlet.

10. The hood according to claim 1, wherein the cooling channel structure is at least partly made of aluminum.

11. A vehicle comprising at least one vehicle component, that, in an operational state thereof, is in need of heat exchange, and the hood according to claim 1, wherein the vehicle component is fluidly connected to the cooling channel structure so as to form a cooling loop.

12. A vehicle according to claim 11, wherein the vehicle component is an internal combustion engine.

13. A vehicle according to claim 11, wherein the vehicle component is a battery pack.

14. The hood according to claim 1, wherein the conduits form a closed system for the cooling fluid.

15. The hood according to claim 1, further comprising an inner panel that forms an inner side portion of the hood and comprises ridge portions that accommodate and cover the conduits.

* * * * *